(12) United States Patent
Ahn et al.

(10) Patent No.: US 11,335,931 B2
(45) Date of Patent: May 17, 2022

(54) HIGHLY ION-SELECTIVE COMPOSITE POLYMER ELECTROLYTE MEMBRANES COMPRISING METAL-ION BLOCKING LAYER, REDOX FLOW BATTERIES COMPRISING THE SAME, AND ELECTROCHEMICAL DEVICES COMPRISING THE SAME

(71) Applicant: KOREA INSTITUTE OF SCIENCE AND TECHNOLOGY, Seoul (KR)

(72) Inventors: Ji Hun Ahn, Seoul (KR); Heung Yong Ha, Seoul (KR); Sheeraz Mehboob, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 189 days.

(21) Appl. No.: 16/691,610

(22) Filed: Nov. 22, 2019

(65) Prior Publication Data
US 2020/0168937 A1    May 28, 2020

(30) Foreign Application Priority Data
Nov. 23, 2018 (KR) .................. 10-2018-0146479

(51) Int. Cl.
| H01M 8/1053 | (2016.01) |
| H01M 8/1027 | (2016.01) |
| H01M 8/1032 | (2016.01) |
| H01M 8/1062 | (2016.01) |
| H01M 8/18 | (2006.01) |
| H01M 8/1039 | (2016.01) |
| H01M 8/10 | (2016.01) |

(52) U.S. Cl.
CPC ....... *H01M 8/1053* (2013.01); *H01M 8/1027* (2013.01); *H01M 8/1032* (2013.01); *H01M 8/1039* (2013.01); *H01M 8/1062* (2013.01); *H01M 8/188* (2013.01); H01M 2008/1095 (2013.01); H01M 2300/0094 (2013.01)

(58) Field of Classification Search
None
See application file for complete search history.

(56) References Cited

U.S. PATENT DOCUMENTS

| 8,628,880 B2 | 1/2014 | Li et al. |
| 9,123,923 B2 | 9/2015 | Zhang et al. |
| 9,147,903 B2 | 9/2015 | Kim |

(Continued)

FOREIGN PATENT DOCUMENTS

| JP | 2005209437 A | 8/2005 |
| JP | 2017114122 A | 6/2017 |

(Continued)

OTHER PUBLICATIONS

M. Vijayakumar et al., "Investigation of local environments in Nafion-SiO2 composite membranes used in vanadium redox flow batteries," Solid State Nuclear Magnetic Resonance, 2012, pp. 71-80, vol. 42, Elsevier Inc.

*Primary Examiner* — Daniel S Gatewood
(74) *Attorney, Agent, or Firm* — Cantor Colburn LLP

(57) ABSTRACT

Disclosed is a composite polymer electrolyte membrane comprising: a support membrane; a metal ion-blocking layer stacked on the support membrane; a stabilization layer; and a protecting layer, wherein the support membrane includes a cation conductive polymer.

19 Claims, 17 Drawing Sheets

(56) References Cited

U.S. PATENT DOCUMENTS

| | | | | |
|---|---|---|---|---|
| 2004/0086762 | A1* | 5/2004 | Maeda | H01M 8/0256 |
| | | | | 429/465 |
| 2009/0263699 | A1* | 10/2009 | Sadasue | H01M 8/0289 |
| | | | | 429/483 |
| 2011/0200890 | A1* | 8/2011 | Kocherginsky | H01M 8/1032 |
| | | | | 429/402 |
| 2012/0263990 | A1* | 10/2012 | Kim | H01M 8/188 |
| | | | | 429/105 |
| 2017/0179514 | A1 | 6/2017 | Bae et al. | |

FOREIGN PATENT DOCUMENTS

| | | |
|---|---|---|
| KR | 100776375 B1 | 11/2007 |
| KR | 1020090078331 A | 7/2009 |
| KR | 1020120118333 A | 10/2012 |
| KR | 1020140043117 A | 4/2014 |
| KR | 101461417 B1 | 11/2014 |
| KR | 1020150061706 A | 6/2015 |
| KR | 1020150098041 A | 8/2015 |
| KR | 101549525 B1 | 9/2015 |
| KR | 101568358 B1 | 11/2015 |
| KR | 1020180094666 A | 8/2018 |
| WO | 2012174463 A1 | 12/2012 |

\* cited by examiner

HIGHLY ION-SELECTIVE COMPOSITE POLYMER ELECTROLYTE MEMBRANES COMPRISING METAL-ION BLOCKING LAYER, REDOX FLOW BATTERIES COMPRISING THE SAME, AND ELECTROCHEMICAL DEVICES COMPRISING THE SAME

CROSS-REFERENCE TO RELATED APPLICATION

This application claims priority to Korean Patent Application No. 10-2018-0146479, filed on Nov. 23, 2018, and all the benefits accruing therefrom under 35 U.S.C. § 119, the contents of which in its entirety are herein incorporated by reference.

DESCRIPTION ABOUT NATIONAL SUPPORT RESEARCH AND DEVELOPMENT

This study was supported by following national research project:
Ministry of Science and ICT, Republic of Korea (Preparation of Inorganic Carbonate by Seawater-based Electrochemical $CO_2$ Conversion, Project No. 1711073323) under the superintendence of Korea Institute of Science and Technology.

BACKGROUND

1. Field

The present disclosure relates to a composite polymer electrolyte membrane including a metal ion-blocking layer stacked on a support membrane. More particularly, the present disclosure relates to a functional composite polymer electrolyte membrane which shows significantly low metal ion conductivity, while maintaining high proton conductivity, and a redox flow battery, electrochemical device and an electrochemical reactor including the same.

2. Description of the Related Art

Recently, as energy needs have been increased with rapid industrial development, research and development of highly stable high-capacity secondary batteries applicable to large-scale energy storage systems and electric vehicles have been conducted intensively. Particularly, vanadium redox flow batteries which allow flexible designing for large-scale energy storage systems, have long life and high stability with no risk of explosion and require low maintenance expenses have been spotlighted.

In the structure of a redox flow battery, a polymer electrolyte membrane (also referred to as 'electrolyte membrane' hereinafter) is an electrical insulator, and functions to prevent physical contact between anolyte and catholyte and to allow permeation of protons. Although such an electrolyte membrane itself does not participate in electrochemical reactions during charge/discharge, it may significantly affect the performance, durability and safety of a battery depending on its materials, porosity and surface and internal characteristics. To allow long-term operation of a vanadium flow battery, it is required for the electrolyte membrane to separate anolyte and catholyte completely from each other and to permeate protons selectively therethrough. However, in the electrolyte membranes according to the related art, $V^{4+}$ and $V^{5+}$ ions as active materials present in catholyte and $V^{2+}$ and $V^{3+}$ ions as active materials present in anolyte may crossover with each other through the electrolyte membrane during charge/discharge, resulting in the problem of rapid degradation of the charge and discharge capacity of a battery.

To overcome the above-mentioned problem, U.S. Pat. No. 9,123,923 discloses an electrolyte membrane obtained by introducing inorganic particles to a porous electrolyte membrane, or grafting amine groups to the ion exchange groups present in an electrolyte membrane. In addition, Korean Patent No. 10-1549525 and Korean Patent Laid-Open No. 10-2013-0145589 disclose an organic/inorganic composite membrane obtained by mixing an ionomer having a cation exchange group with inorganic particles, such as silica, alumina, zirconia and titania. The electrolyte membranes suggested in the above-mentioned patent documents provide improved hydrophilicity and reduce vanadium ion crossover. However, according to Solid State Nuclear Magnetic Resonance, 42 (2012) 71-80, it is reported that such organic/inorganic composite membranes show low durability, when they are applied to redox flow batteries.

U.S. Pat. No. 9,147,903 discloses a method for improving cation selectivity by spraying a polymer having a pyridinium group, pyrrolidinium group and ammonium group capable of anion exchange onto the surface of a cation exchange membrane to form a layer with a thickness of several hundreds of micrometers. In addition, Korean Patent Nos. 10-1549525 and 10-1461417 disclose an acid-base electrolyte membrane obtained by mixing a sulfonic acid group-containing ionomer with a quaternary ammonium salt-containing ionomer. The acid-base electrolyte membranes suggested by the above-mentioned patent documents efficiently control the active material crossover to allow operation of a redox battery with improved current efficiency. However, there is a disadvantage in that the electrolyte membranes show increased resistance to cause significant degradation of voltage efficiency. For this, the redox flow battery shows energy efficiency similar to or lower than the energy efficiency of the existing batteries.

REFERENCES

Patent Documents (Patent Document 1) U.S. Pat. No. 9,123,923 B2
(Patent Document 2) KR 10-1549525 B1
(Patent Document 3) KR 10-2015-0061706 A
(Patent Document 4) U.S. Pat. No. 9,147,903 B2
(Patent Document 5) KR 10-1549525 B1
(Patent Document 6) KR 10-1461417 B1

Non-Patent Documents (Non-Patent Document 1) Solid State Nuclear Magnetic Resonance, 42 (2012) 71-80

SUMMARY

The present disclosure is directed to providing a polymer electrolyte membrane capable of solving the above-mentioned problems according to the related art. More particularly, the present disclosure is directed to providing a functional composite electrolyte membrane which shows significantly reduced permeability to metal ions larger than proton, while maintaining proton conductivity, and has improved electrochemical durability and stability.

In one aspect, there is provided a composite polymer electrolyte membrane comprising: a support membrane; and a metal ion-blocking layer stacked on the support membrane, wherein the support membrane includes a cation conductive polymer.

According to an embodiment, the support membrane may include a non-porous separator including a cation conductive polymer or a porous separator of which pores are filled with a cation conductive polymer.

According to an embodiment, the composite polymer electrolyte membrane may further include a stabilization layer formed on the metal ion-blocking layer.

According to an embodiment, the stabilization layer may have fluorine or silicon functional groups attached thereto or may be doped with fluorine elements or silicon elements.

According to an embodiment, the cation conductive polymer may include a cation exchange group selected from the group consisting of a sulfonic acid group, phosphoric acid group and a carboxylic acid group.

According to an embodiment, the sulfonic acid group-containing cation conductive polymer may be selected from the group consisting of perfluorosulfonic acid, poly(styrene sulfonic acid) (PSSA), sulfonated poly(ether ether ketone) (SPEEK), sulfonated poly(ether sulfone) (SPES), sulfonated poly(aryl ether ketone) (SPAEK), sulfonated polybenzimidazole (S-PBI), sulfonated poly(phenylene oxide) (SPPO), and sulfonated polyimide (SPI).

According to an embodiment, the cation conductive polymer may be a perfluorosulfonic acid-based electrolyte or hydrocarbon-based polymer electrolyte.

According to an embodiment, the porous separator may include at least one polymer selected from the group consisting of polyethylene (PE), polysulfide (PS), polypropylene (PP), polycarbonate (PC), polytetrafluoroethylene (PTFE), polyvinyl chloride (PVC), polyvinylidene difluoride (PVdF), polyacrylonitrile (PAN), and polyimide (PI).

According to an embodiment, the support membrane may have a thickness of 5-500 μm.

According to an embodiment, the metal ion-blocking layer may include an anion exchange polymer or anion exchange polymer electrolyte material.

According to an embodiment, the anion exchange polymer may be at least one selected from the group consisting of polypyrrole, polyaniline, fluorinated polyaniline and poly (fluoroaniline), polypyridine, polyazepine, polycarbazole, and polyindole, and the anion exchange polymer electrolyte material may be a chloro- or bromomethylated polymer to which at least one anion exchange group selected from trimethyl amine, imidazolium, phosphonium, ammonium, guanidinium and benzimidazolium is bound.

According to an embodiment, the polymer to which at least one anion exchange group is bound may be at least one polymer selected from polysulfone, polyetheretherketone, polyphenylene oxide and polyethylene.

According to an embodiment, the anion exchange polymer may include polyaniline in the emeraldine state.

According to an embodiment, the metal ion-blocking layer may be stacked on either surface or both surfaces of the support membrane.

According to an embodiment, the composite polymer electrolyte membrane may include at least one metal ion-blocking layer.

According to an embodiment, the metal ion-blocking layer may be protonated.

According to an embodiment, the metal ion-blocking layer may have a thickness of 100 μm or less.

According to an embodiment, the composite polymer electrolyte membrane may further include a protective layer, and the protective layer may include a cation conductive polymer.

In another aspect, there is provided a method for manufacturing a composite polymer electrolyte membrane, which includes: applying a solution containing an anion exchange polymer electrolyte onto a support membrane to form a metal ion-blocking layer; and drying and heat treating the support membrane coated with the anion exchange polymer electrolyte, wherein the support membrane includes a cation conductive polymer.

According to an embodiment, the method may further include protonating the metal ion-blocking layer.

According to an embodiment, the method may further include forming a stabilization layer on the surface of the metal ion-blocking layer.

According to an embodiment, the stabilization layer may be formed by doping a fluorine compound or silicon compound.

According to an embodiment, the method may further include forming a protective layer by applying a cation conductive polymer to the surface of the composite polymer electrolyte membrane.

In still another aspect, there is provided a vanadium redox flow battery including the composite polymer electrolyte membrane according to the present disclosure.

The composite polymer electrolyte membrane including a metal ion-blocking layer according to an embodiment of the present disclosure may effectively prevent permeation of metal cations through the surface thereof, while maintaining proton conductivity.

In addition, it is possible to significantly improve the electrochemical stability of a composite polymer electrolyte membrane by doping a stabilizing functional group additionally to the surface of the composite polymer electrolyte membrane, while maintaining ion conductivity and selectivity.

Further, it is possible to significantly improve the electrochemical stability of a composite polymer electrolyte membrane by further forming a protective layer, while maintaining ion conductivity and selectivity.

The composite polymer electrolyte membrane according to the present disclosure may reduce vanadium ion permeability significantly, while maintaining proton conductivity, and thus may solve the problem of a metal active material crossover phenomenon, while providing higher ion selectivity, efficiency and durability.

DETAILED DESCRIPTION

Exemplary embodiments now will be described more fully hereinafter.

However, the following exemplary embodiments are for illustrative purposes only, and the present disclosure may be embodied in many different forms and should not be construed as limited to the exemplary embodiments set forth therein.

In addition, various changes and modifications may be made without departing from the scope of the present disclosure. Thus, it should be noted that the present disclosure is not limited to specific embodiments disclosed herein but covers any modifications, equivalents or substitutes within the spirit and scope of the invention as defined in the following claims.

Composite Polymer Electrolyte Membrane

In one aspect, there is provided a composite polymer electrolyte membrane, comprising: a support membrane 100; and a metal ion-blocking layer 200 formed on the support membrane 100, wherein the support membrane 100 includes a cation conductive polymer.

According to an embodiment, the composite polymer electrolyte membrane may be an electrolyte membrane for use in a vanadium redox flow battery.

Figure 1A:
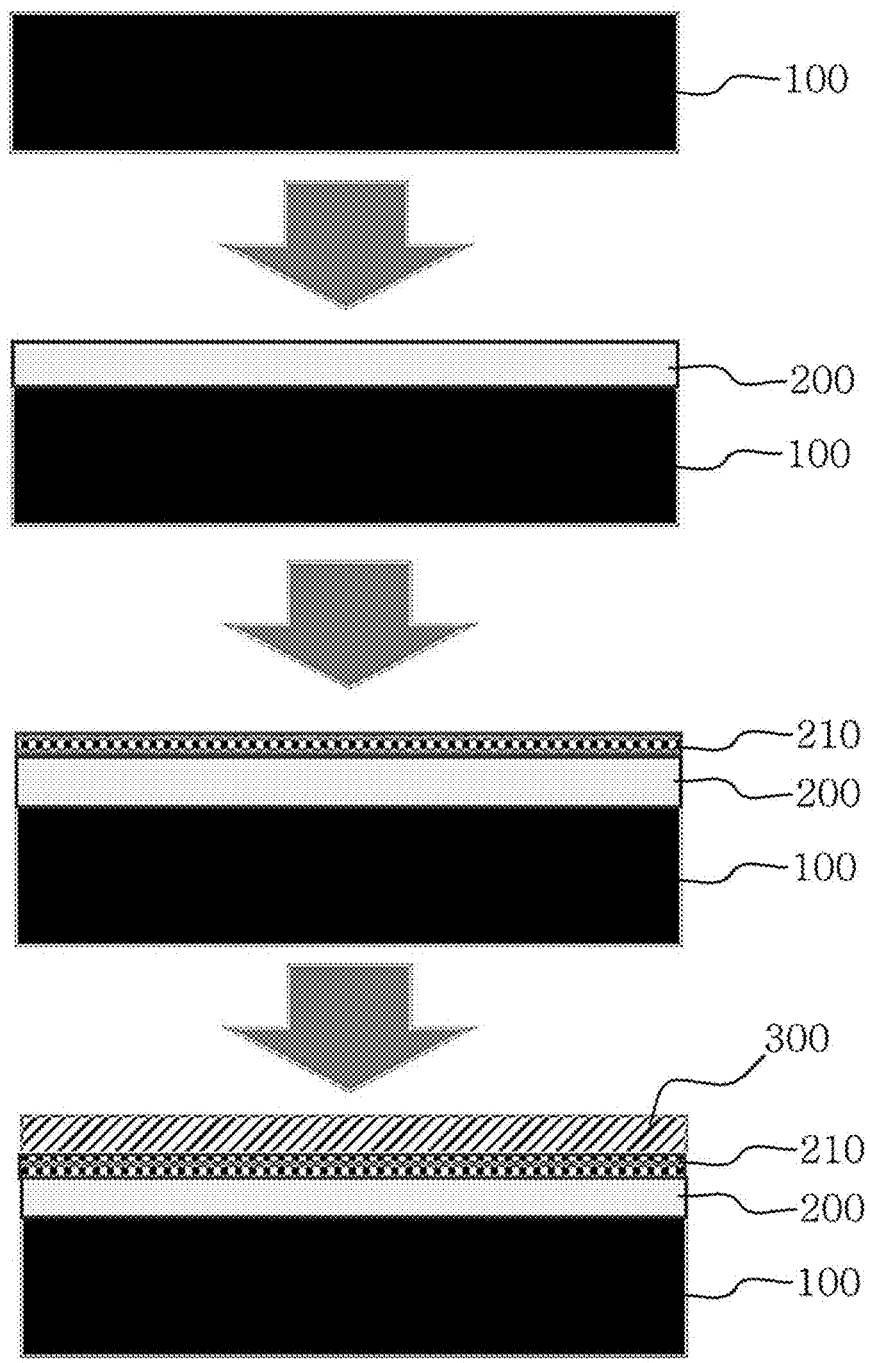
FIG. 1A and FIG. 1B are schematic views illustrating the process for manufacturing a composite polymer electrolyte membrane according to an embodiment of the present disclosure.

According to an embodiment, the support membrane 100 may include a non-porous separator including a cation conductive polymer or a porous separator 130 of which pores are filled with a cation conductive polymer. For example, the support membrane 100 may be a non-porous separator including (or made of) a cation conductive polymer, particularly a non-porous ion exchange polymer membrane (FIG. 1A).

Figure 2:
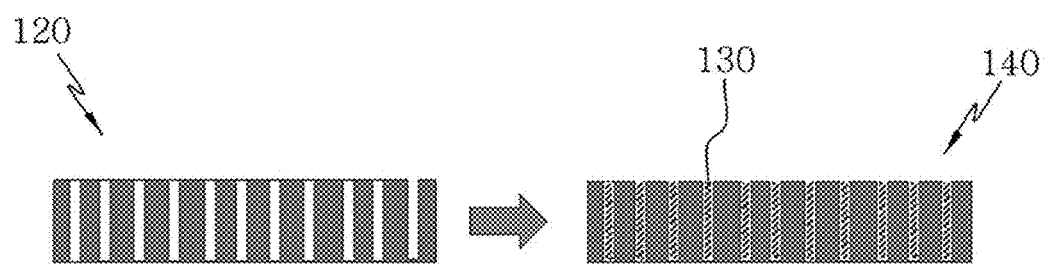
FIG. 2 is a schematic view illustrating the structure of the composite polymer electrolyte membrane according to an embodiment of the present disclosure, wherein the porous separator is impregnated with at least one cation conductive polymer.

According to another embodiment, the support membrane 100 may be a porous separator 120 impregnated with at least one cation conductive polymer 130 and the support membrane 100 may be a reinforced membrane 140 (FIG. 2). For example, as shown in FIG. 2, the support membrane may be a reinforced electrolyte membrane 140 including a porous polymer separator 120 of which pores are filled with an ion exchange polymer electrolyte material 130.

According to an embodiment, the porous separator 120 may include at least one polymer selected from the group consisting of polyethylene (PE), polysulfide (PS), polypropylene (PP), polycarbonate (PC), polytetrafluoroethylene (PTFE), polyvinyl chloride (PVC), polyvinylidene difluoride (PVdF), polyacrylonitrile (PAN), and polyimide (PI).

According to an embodiment, the porous separator 120 may have a porosity of 5-99%, particularly 30-90%.

According to an embodiment, the porous separator 120 may include an ion conductive inorganic material, such as at least one ion conductive inorganic material selected from silica, alumina, titania and seria. Therefore, the support membrane may be a reinforced membrane consisting of a porous separator impregnated with not only a cation conductive polymer but also an ion conductive inorganic material, and thus the composite polymer electrolyte membrane may provide improved hydrophilicity and may reduce vanadium ion crossover.

According to an embodiment, the composite polymer electrolyte membrane may further comprise a metal ion-blocking layer 200 formed on the support membrane 100.

According to an embodiment, the composite polymer electrolyte membrane may further include a stabilization layer 210 formed on the metal ion-blocking layer 200.

The composite polymer electrolyte membrane or the metal ion-blocking layer 200 contained in the composite polymer electrolyte membrane may have poor electrical durability in an acidic or alkaline solution. However, when the stabilization layer 210 is formed on the metal ion-blocking layer, it is possible to improve the durability.

According to an embodiment, the stabilization layer 210 may have fluorine or silicon functional groups attached thereto or may be doped with fluorine elements or silicon elements. The stabilization layer 210 may be formed by attaching fluorine or silicon functional groups onto the metal ion-blocking layer 200, or doping fluorine or silicon elements thereto. In this manner, it is possible to improve the stability of the metal ion-blocking layer 200.

Figure 1B:
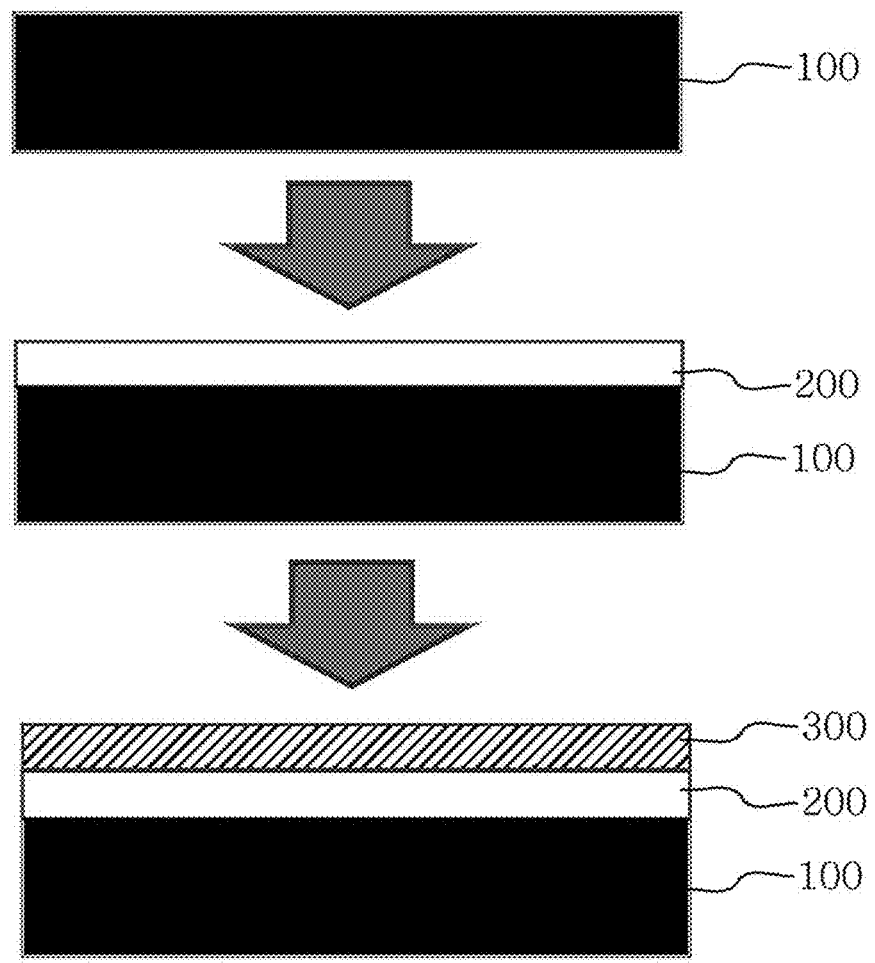

Referring to FIG. 1 and FIG. 6, fluorine or silicon functional groups may be attached to the surface of the metal ion-blocking layer, or fluorine or silicon elements may be doped thereto by allowing fluorine gas ($F_2$) to flow through the metal ion-blocking layer 200 applied to the composite polymer electrolyte membrane, or by irradiating plasma including a fluorine compound or silicon compound as a precursor thereto. In this manner, the stabilization layer 210 may be formed, thereby improving the durability of the metal ion-blocking layer 200. For example, it is possible to retain the capacity of a vanadium redox flow battery, even when the battery is subjected to repeated charge/discharge cycles, such as 40 or more charge/discharge cycles.

According to an embodiment, the cation conductive polymer may include a cation exchange group selected from the group consisting of a sulfonic acid group, phosphoric acid group and a carboxylic acid group.

According to an embodiment, the sulfonic acid group-containing cation conductive polymer may be selected from the group consisting of perfluorosulfonic acid, poly(styrene sulfonic acid) (PSSA), sulfonated poly(ether ether ketone) (SPEEK), sulfonated poly(ether sulfone) (SPES), sulfonated poly(aryl ether ketone) (SPAEK), sulfonated polybenzimidazole (S-PBI), sulfonated poly(phenylene oxide) (SPPO), and sulfonated polyimide (SPI).

According to an embodiment, the cation conductive polymer may include a negatively charged functional group, such as —$SO^{3-}$, —$COO^-$, —$PO_3^{2-}$, or —$PO_3H^-$.

According to an embodiment, the cation conductive polymer may include at least one of a perfluorosulfonic acid-based electrolyte or hydrocarbon-based polymer electrolyte.

Particularly, the support membrane 100 may be a cation conductive polymer membrane. The cation conductive polymer membrane may be a fluorine-containing cation membrane, may be stable in strong acid and strong alkali atmosphere, and may have excellent electrochemical durability. For example, the cation membrane may be a polymer electrolyte membrane based on a perfluorosulfonic acid (PFSA) material, and particular examples thereof may include Nafion membranes (DuPont Inc.), Flemion membranes (Asahi Glass Chemicals, Inc.), Fumasep membranes (Fumatech, Inc.), Ballard advanced membranes (Ballard Inc.), Gore-Select membranes (Gore Inc.), Aciplex membranes (Asahi Kasei, Inc.), or the like.

According to another embodiment, the support membrane 100 may be a hydrocarbon-based cation conductive polymer membrane, may be stable in strong acid and strong alkali atmosphere and may have excellent electrochemical tolerance. For example, the support membrane may be membranes made of sulfonated polysulfone, sulfonated polyethersulfone, sulfonated polystyrene, sulfonated polyarylene and modified polymer electrolyte materials based on the above-mentioned materials.

According to an embodiment, the support membrane 100 may have a thickness of 1-500 µm. In addition, the support membrane may have a thickness of 5-500 µm, 5-300 µm, 5-200 µm, or 1-100 µm, particularly 10-100 µm. When the support membrane has a thickness less than 5 µm, it may have poor electrochemical durability. When the support membrane has a thickness larger than 500 µm, it may have a big resistance against ion permeation. Meanwhile, when the support membrane 100 is a porous separator 120 impregnated with at least one cation conductive polymer 130, the support membrane may have a thickness of 1-200 µm.

According to an embodiment, the composite polymer electrolyte membrane may be obtained by stacking the metal ion-blocking layer 200 on the support membrane 100. The metal ion-blocking layer 200 may be stacked on the support membrane 100. For example, the metal ion-blocking layer 200 may be stacked on the support membrane 100, specifically the metal ion-blocking layer 200 may be impregnated in or applied onto either surface or both surfaces of the support membrane 100. Herein, the composite polymer electrolyte membrane shows reduced permeability to metal ions lower than proton, while maintaining a good permeability to proton.

According to an embodiment, the metal ion-blocking layer 200 may include an anion exchange polymer or anion exchange polymer electrolyte material. For example, the anion exchange polymer may be at least one selected from the group consisting of polypyrrole, polyaniline, fluorinated polyaniline and poly(fluoroaniline), polypyridine, polyazepine, polycarbazole, and polyindole. The metal ion-blocking layer 200 is made of a polymeric material, and may have significantly low permeability to metal ions, while maintaining proton conductivity.

Particularly, polyaniline may be in the leuco-emeraldine, emeraldine or pernigraniline state, depending on the oxidation environment of the polymer. Preferably, polyaniline may be in the emeraldine state and may have ion conductivity. In addition, in order to allow permeation of the emeraldine into the ion channels present inside of a cation exchange membrane, emeraldine salt may be dispersed in an organic solvent to prepare a polyaniline solution.

In addition, the metal ion-blocking layer 200 may include an anion exchange polymer electrolyte material, and the anion exchange polymer electrolyte material may be a chloro- or bromomethylated polymer to which at least one anion exchange group selected from trimethyl amine, imidazolium, phosphonium, ammonium, guanidinium and benzimidazolium is bound. In addition, the polymer to which at least one anion exchange group is bound may include at least one polymer selected from polysulfone, polyetheretherketone, polyphenylene oxide and polyethylene.

According to an embodiment, the anion exchange polymer or anion exchange polymer electrolyte material may form ionic bonding with the cation conductive polymer of the support membrane through electrostatic attraction force.

According to an embodiment, when the metal ion-blocking layer 200 is stacked on the support membrane 100, the anion exchange polymer or anion exchange polymer electrolyte material may partially permeate into the support membrane. Herein, the metal ion-blocking layer formed on the support membrane may be removed so that only the anion exchange polymer or anion exchange polymer electrolyte material permeated into the support membrane may be left. In other words, the metal ion-blocking layer 200 may be supported in or applied onto the support membrane. In this case, the composite polymer electrolyte membrane shows reduced overall resistance.

Figure 3A:
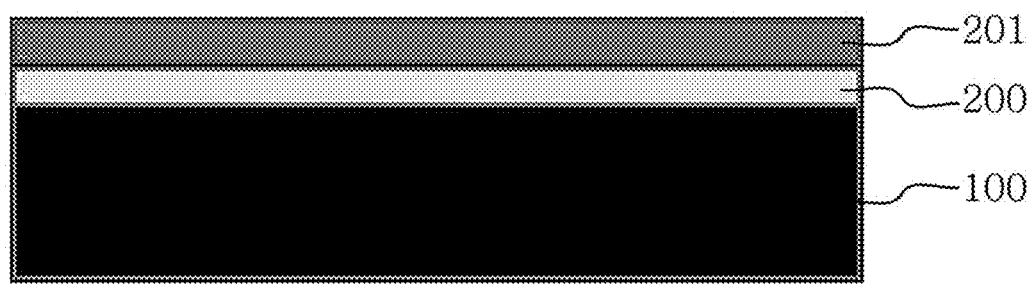
FIG. 3A and FIG. 3B are schematic views illustrating a multilayer structure in the composite polymer electrolyte membrane, including at least one metal ion-blocking layer according to an embodiment of the present disclosure.
Figure 3B:
Figure 4A:
FIG. 4A and FIG. 4B are schematic views illustrating a stabilization layer formed on the metal ion-blocking layer of the composite polymer electrolyte membrane according to an embodiment of the present disclosure.
Figure 4B:
Figure 5A:
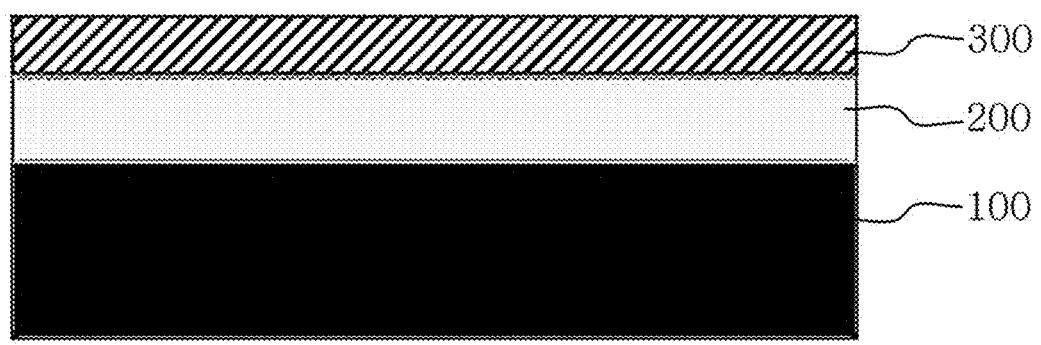
FIG. 5A and FIG. 5B are schematic views illustrating a protective layer applied to the metal ion-blocking layer of the composite polymer electrolyte membrane according to an embodiment of the present disclosure.
Figure 5B:

According to an embodiment, the metal ion-blocking layer 200 may be stacked on either surface or both surfaces of the support membrane 100 (FIGS. 3A and 3B).

However, the metal ion-blocking layer 200 stacked on the support membrane may have poor electrochemical durability in an acidic or alkaline solution. Thus, in order to improve the electrochemical durability, the composite polymer electrolyte membrane may include at least one metal ion-blocking layer according to an embodiment. When multiple metal ion-blocking layers 200, 201 are present, any one of the above-mentioned anion exchange polymers or a blend thereof may be stacked, and then any one of the above-mentioned anion exchange polymers or a blend thereof may be further stacked thereon.

For example, the metal ion-blocking layers 200 may be different materials and may be multiple metal ion-blocking layers formed by applying two or more blocking layers having different characteristics sequentially. The layers forming such multiple metal ion-blocking layers may include materials different from one another, or the adjacent layers may include different materials.

According to an embodiment, the metal ion-blocking layer 200 may be protonated. For example, the metal ion-blocking layer may be treated with acid to improve the oxidization degree and to convert the cation exchange membrane into a protonated membrane.

According to an embodiment, the metal ion-blocking layer 200 may have a thickness of 100 μm or less. For example, the metal ion-blocking layer may have a thickness of 10-100 μm, particularly 1-10 μm. When the metal ion-blocking layer has a thickness larger than 100 μm, the electrolyte membrane shows increased resistance to cause deterioration of the voltage efficiency of a battery.

According to an embodiment, the composite polymer electrolyte membrane may further include a stabilization layer 210 on the surface of the metal ion-blocking layer 200. Specifically, the stabilization layer 210 may include specific functional groups, such as fluorine or silicon functional groups attached to the surface of the metal ion-blocking layer 200. In addition, the fluorine elements or silicon elements may be doped to the surface of the metal ion-blocking layer 200 to form a stabilization layer 210. In this manner, it is possible to improve the electrochemical stability and durability of the composite polymer electrolyte membrane.

According to an embodiment, the stabilization layer 210 may have a thickness range of 0.1-10 nm. When the stabilization layer 210 has a thickness range of 0.1-10 nm, the metal ion-blocking layer 200 improves the stability.

According to an embodiment, the composite polymer electrolyte membrane may further include a protective layer 300. Specifically, the composite polymer electrolyte membrane may further include a protective layer 300 directly on top of the ion-blocking layer 200 (FIG. 1B) or on top of the stabilization layer 210 (FIG. 1A). The composite polymer electrolyte membrane or the metal ion-blocking layer 200 contained in the composite polymer electrolyte membrane may have poor electrochemical durability in an acidic or alkaline solution. However, it is possible to improve the durability by further incorporating the protective layer 300.

As shown in FIG. 1 and FIG. 5A to FIG. 6B, the composite polymer electrolyte membrane may further include a protective layer 300, which may be coated on the metal ion-blocking layer 200 or on the stabilization layer 210.

According to an embodiment, the protective layer may include the same cation conductive polymer as the cation conductive polymer contained in the support membrane 100. For example, the protective layer may include any one of the above-mentioned cation conductive polymers or a blend thereof.

Figure 6A:
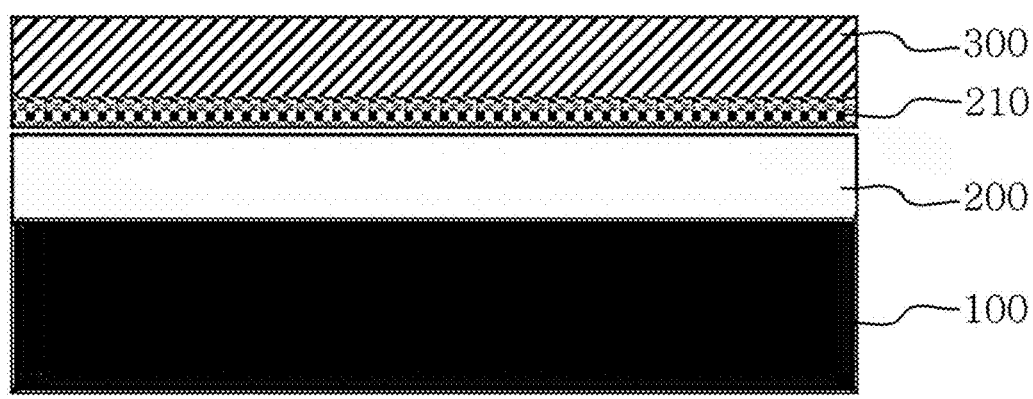
FIG. 6A and FIG. 6B are schematic views illustrating a protective layer formed on the stabilization layer of the composite polymer electrolyte membrane according to an embodiment of the present disclosure.
Figure 6B:

Meanwhile, the composite polymer electrolyte membrane may further include a protective layer 300 in addition to the stabilization layer 210 formed on the metal ion-blocking layer 200 (FIGS. 6A and 6B). In this case, the composite polymer electrolyte membrane may have excellent stability and durability.

According to an embodiment, the protective layer 300 may have a thickness of 0.1-100 μm, particularly 1-20 μm.

According to an embodiment, the composite polymer electrolyte membrane may include at least one composite polymer electrolyte membrane. For example, an additional metal ion-blocking layer may be stacked on the outermost layer, i.e. protective layer, of the first composite polymer electrolyte membrane, and then a stabilization layer and/or protective layer may be further formed thereon so that the second composite polymer electrolyte membrane may be stacked on the first composite polymer electrolyte membrane (FIG. 1A). Herein, the first composite polymer electrolyte membrane may be different from the second composite polymer electrolyte membrane, wherein the additional composite polymer electrolyte membrane (e.g. the second composite polymer electrolyte membrane) may include no support membrane 100.

According to an embodiment, such multilayered composite polymer electrolyte membrane may have 2-5 composite polymer electrolyte membranes (i.e. 2-5 layers). Therefore, the resultant composite polymer electrolyte membrane may include the first to the fifth composite polymer electrolyte membranes.

Method for Manufacturing Composite Polymer Electrolyte Membrane

In another aspect, there is provided a method for manufacturing a composite polymer electrolyte membrane, which includes: applying a solution containing an anion exchange polymer electrolyte onto a support membrane to form a metal ion-blocking layer 200; and drying and heat treating the support membrane coated with the anion exchange polymer electrolyte, wherein the support membrane includes a cation conductive polymer.

Figure 7:
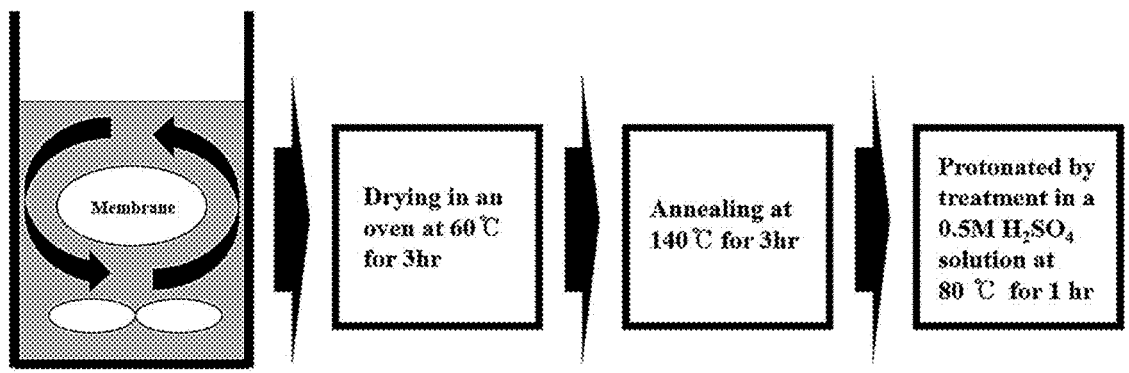
FIG. 7 is a flow chart illustrating the method for manufacturing a composite polymer electrolyte membrane according to an embodiment of the present disclosure.
Figure 8A:
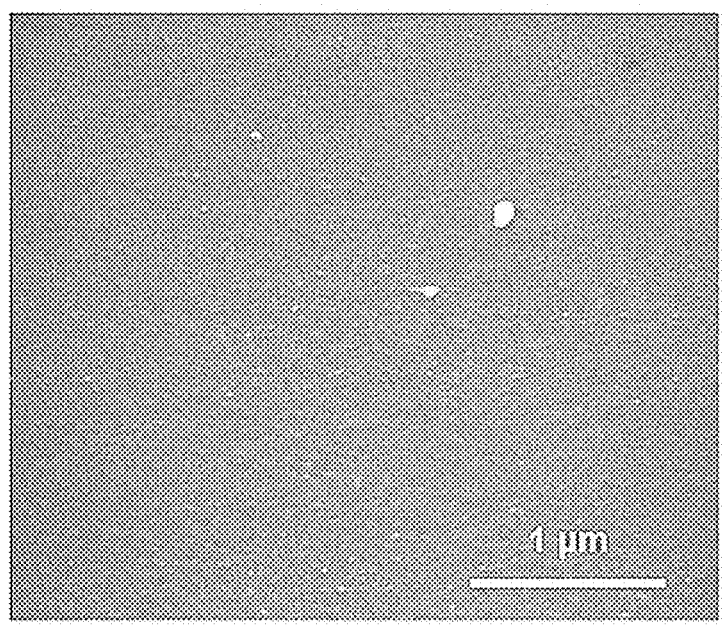
FIG. 8A to FIG. 8D show transmission electron microscopic images illustrating Nafion 115 membrane (Comparative Example 1) and a composite membrane (Example 1) obtained by applying polyaniline as a metal ion-blocking layer, wherein (A) shows the surface of Nafion 115 membrane, (B) shows the surface of r-PN composite membrane, (C) shows the sectional view of Nafion 115 membrane, and (D) shows the sectional view of r-PN composite membrane.
Figure 8B:
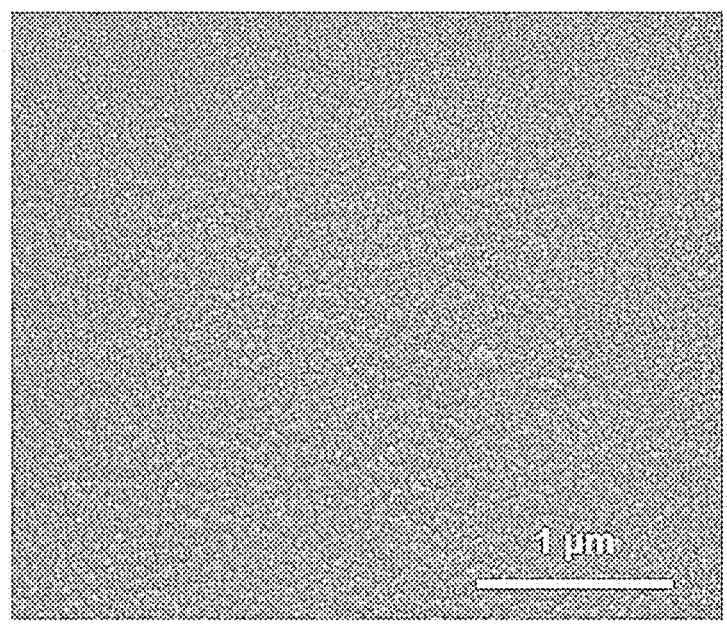
Figure 8C:
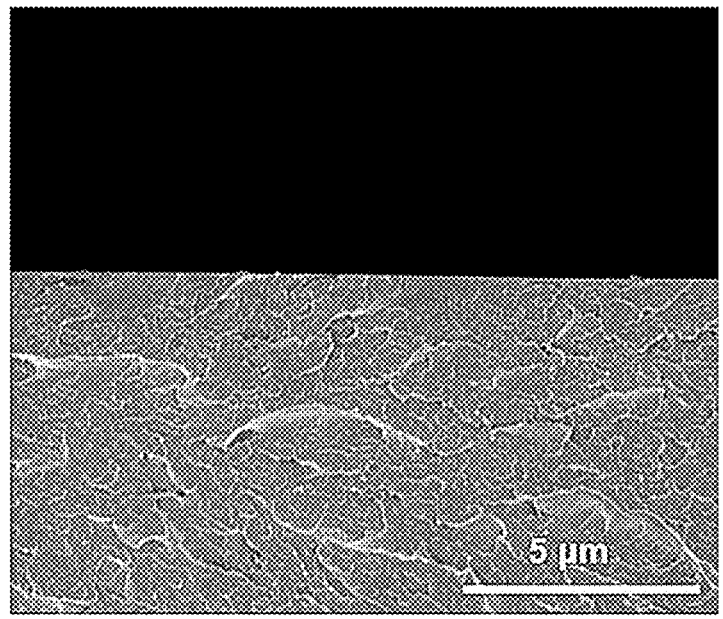
Figure 8D:
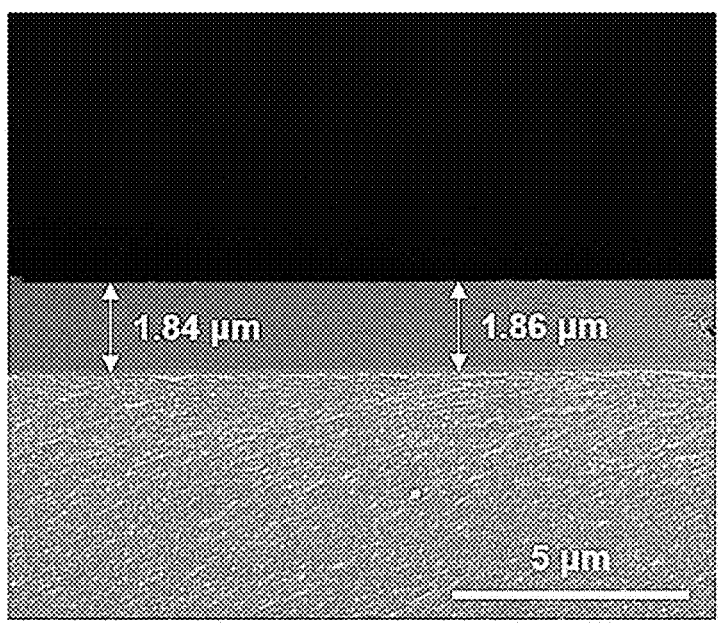

FIG. 7 illustrates a procedure to fabricate a metal ion-blocking layer 200 formed by applying polyaniline (PANI) to a support membrane through dip coating.

According to an embodiment, the metal ion-blocking layer may be formed by applying a solution containing an anion exchange polymer electrolyte through at least one process selected from the group consisting of spin coating, dip coating, spray coating, tape casting, screen printing, electrospinning and in-situ polymerization.

Herein, the thickness, shape and characteristics of the metal ion-blocking layer 200 may be controlled by the concentration of anion exchange polymer electrolyte contained in the solution, treatment time, drying temperature, drying time, or the like.

According to an embodiment, the solution may include a solvent, which may include an organic solvent, such as N-methyl-2-pyrrolidone (NMP), dimethyl sulfoxide (DMSO), dimethyl formamide (DMF), chloroform (CHF) or acetonitrile (ACN).

Additionally, the method for manufacturing a composite polymer electrolyte membrane may further include pretreating the support membrane 100. Specifically, the pretreatment may include at least one of swelling the support membrane in distilled water at a temperature of 80-100° C. for 1 hour or more, dipping the swelled support membrane in hydrogen peroxide solution at a temperature of 80-100° C. to remove surface impurities, and converting the negatively charged functional groups of the support membrane into protons through acid treatment in sulfuric acid or hydrochloric acid solution.

According to an embodiment, the metal ion-blocking layer 200 may be formed on either surface or both surfaces of the support membrane 100.

According to an embodiment, the anion exchange polymer electrolyte may be applied during the formation of the metal ion-blocking layer 200 so that it may be supported in the ion channels present in the cation conductive polymer contained in the support membrane. Therefore, the anion exchange polymer electrolyte may be present both on the surface of the support membrane and in the ion channels present in the cation conductive polymer. For example, polyaniline may be in the leuco-emeraldine, emeraldine or pernigraniline state, depending on the oxidation environment of polymer. Preferably, polyaniline may be in the emeraldine state and may have ion conductivity. In addition, in order to allow permeation of emeraldine into the ion channels present inside of a cation exchange membrane, emeraldine salt may be dispersed in an organic solvent to prepare a polyaniline solution.

According to an embodiment, the emeraldine salt form and emeraldine base form of polyaniline may have different solubility and dispersibility. Thus, the solubility or dispersibility of polyaniline solution may be increased by carrying out heating or ultrasonication to such a degree that the organic solvent may not be evaporated.

According to an embodiment, the emeraldine salt form of polyaniline may be prepared by synthesizing polyaniline through oxidative polymerization of aniline monomers and increasing the oxidization degree of the resultant polyaniline. Then, it may be dissolved in an organic solvent to provide a solution containing an anion exchange polymer electrolyte.

According to an embodiment, after the metal ion-blocking layer 200 is formed, the anion exchange polymer electrolyte present in an excessive amount on the surface of the composite polymer electrolyte membrane may be removed to reduce the thickness of the layer. In this manner, it is possible to reduce the overall resistance of the composite polymer electrolyte membrane. In addition, the resultant composite polymer electrolyte membrane may be treated with acid to improve the oxidization degree and to convert the cation exchange membrane into a protonated form.

Then, the support membrane 100 coated with the anion exchange polymer electrolyte may be dried and heat treated. For example, it may be dried and annealed with a hot oven and UV rays. During the drying and heat treatment, the solvent remaining after applying the metal ion-blocking layer may be removed. The drying and heat treatment may be carried out at a temperature of 250° C. or lower.

According to an embodiment, the drying and heat treatment may be carried out at a temperature of 250° C. or lower for 1-5 hours.

According to an embodiment, after the drying and heat treatment, the anion exchange polymer electrolyte present in an excessive amount on the surface of the composite polymer electrolyte membrane may be removed.

According to an embodiment, the method may further include protonating the metal ion-blocking layer 200. Specifically, the composite polymer electrolyte membrane may be treated with acid in sulfuric acid solution or hydrochloric acid solution having a predetermined concentration at a temperature of 80-100° C. or lower for about 1 hour so that the metal ion-blocking layer 200 may be protonated.

According to an embodiment, the method may further include forming a stabilization layer 210 on the surface of the metal ion-blocking layer 200. Specifically, the stabilization layer 210 may be formed by attaching specific functional groups, such as fluorine or silicon functional groups to the surface of the metal ion-blocking layer 200. In addition, the fluorine elements or silicon elements may be doped to the surface of the metal ion-blocking layer 200 to form a stabilization layer 210. In this manner, it is possible to improve the electrochemical stability and durability of the composite polymer electrolyte membrane According to an embodiment, the stabilization layer 210 may be formed by doping a fluorine compound or silicon compound. Specifically, the stabilization layer 210 may be formed by doping a fluorine compound by using fluorine gas or fluorine plasma, or by doping a silicon compound through treatment with silicon plasma.

According to an embodiment, the method may further include forming a protective layer 300 by applying a cation conductive polymer to the surface of the composite polymer electrolyte membrane. For example, a cation conductive polymer may be applied to the metal ion-blocking layer or stabilization layer to form a protective layer 300. The metal ion-blocking layer 200 contained in the composite polymer electrolyte membrane may have poor electrochemical durability in an acidic or alkaline solution. Thus, it is possible to improve the durability by applying a cation conductive polymer to form a protective layer 300.

According to an embodiment, the cation conductive polymer may include the same material as used for the support membrane. For example, the cation conductive polymer may include any one of the above-mentioned cation conductive polymers or a blend thereof.

Vanadium Redox Flow Battery, Electrolyzer and Electrochemical Reactor

In still another aspect, there is provided a vanadium redox flow battery including the composite polymer electrolyte membrane according to the present disclosure.

According to an embodiment, the vanadium redox flow battery may be obtained by using any conventional method known to those skilled in the art, and the redox flow battery is not limited to any specific embodiment.

According to an embodiment, the process for manufacturing a redox flow battery by using a functional multilayered composite membrane including a metal ion-blocking layer may be carried out by any conventional method known to those skilled in the art, and the redox flow battery is not limited to any specific embodiment.

Further, the composite polymer electrolyte membrane according to the present disclosure may be applied to an electrolyzer and electrochemical reactor.

In yet another aspect, there are provided an electrolyzer including the composite polymer electrolyte membrane according to the present disclosure, and an electrochemical reactor including the composite polymer electrolyte membrane according to the present disclosure. The electrolyzer and electrochemical reactor may be obtained by any conventional method known to those skilled in the art, and are not limited to any specific embodiments.

The vanadium redox flow battery may have excellent battery characteristics, such as current efficiency, energy efficiency, durability and capacity retention rate. In addition, the multilayered composite membrane may be used for various electrolyzers or electrochemical reactors using acidic and basic electrolytes to improve the performance and life of the electrolyzers and reactors.

Hereinafter, the present invention will be described with respect to the specific embodiments. However, the following examples are for illustrative purposes only and are not intended to limit the scope of the present disclosure.

Comparative Example 1

A commercially available electrolyte membrane, Nafion 115 (Dupont Co.), was dipped in distilled water at 80° C. for 1 hour or more so that it might be swelled sufficiently. The membrane was dipped in 5% hydrogen peroxide solution at a temperature of 80° C. to remove the surface impurities, and then washed with ultrapure water repeatedly to remove the residual hydrogen peroxide remaining on the membrane surface. Then, the membrane was acid-treated by introducing it to sulfuric acid solution at 80° C., and the electrolyte membrane surface was washed with ultrapure water to remove the residual acid remaining on the surface of the cation exchange membrane, thereby preparing a pretreated Nafion 115 membrane.

Example 1

A support membrane, Nafion 115 membrane, was dipped in N-methyl-2-pyrrolidone (NMP) solution containing polyaniline dispersed therein for about 1 hour and was removed from the solution at a constant rate. First, polyaniline emeraldine salt (MW>15,000) was dissolved in a NMP solution to a concentration of 1 g/L at room temperature, and the resultant solution was agitated for 30 minutes to disperse polyaniline sufficiently in NMP. Then, in order to apply polyaniline to the Nafion membrane through a dip coating process, the pretreated Nafion 115 membrane was dipped in a polyaniline solution for 1 hour and taken out from the solution gradually at a constant rate. The resultant electrolyte membrane coated with polyaniline was dried at room temperature for 3 hours, and then further dried in an oven at 60° C. for 3 hours. The dried electrolyte membrane was heat treated at 140° C. for 3 hours to perform annealing of the polymer membrane, thereby providing a raw-polyaniline-coated Nafion membrane (r-PN) composite electrolyte membrane having a structure like the one in FIG. 5B without protecting layers 300.

Example 2

A protonated polyaniline-coated Nafion (H-PN) composite electrolyte membrane was obtained in the same manner as Example 1, except that the r-PN electrolyte membrane according to Example 1 was treated with acid in 0.5M $H_2SO_4$ solution at 80° C. for 1 hour to carry out protonation and washed with ultrapure water at 80° C. many times.

Test Example 1

(1-1) Characterization of Electrolyte Membranes

The morphology of each electrolyte membrane was observed with a scanning electron microscope, NOVA-scanning electron microscope (NOVA-SEM, NNS 200, FEI), and the surface properties thereof were analyzed by using Fourier Transform infrared (FT-IR) spectrometer (NICOLET iS10, Thermo Scientific).

Vanadium ion permeability was determined by using a cell for permeability determination (area of electrolyte membrane for determination: 7.06 $cm^2$). In addition, 40 mL of 3M $H_2SO_4$ containing 1.5M $VOSO_4$ dissolved therein was introduced to the feed side and 40 mL of 3M $H_2SO_4$ containing 1.5M $MgSO_4$ dissolved therein was used for the permeate side so that the effect of osmotic pressure might be minimized. Then, 4 mL of permeate was sampled from the permeate side at predetermined intervals and the concentration of $VO^{2+}$ ions was determined by using an ultraviolet-visible spectroscopic analyzer (JENWAY 7305, Jenway Scientific Equipment).

(1-2) Electrochemical Characterization

The resistance of each composite electrolyte membrane was determined by using an electrochemical impedance analyzer (Autolab, PGSTAT30). The composite electrolyte membrane was used to manufacture a redox flow battery and the performance of the battery was determined through a charge/discharge test. The electrolyte membrane was interposed between two carbon felt electrodes (XF-30A, TOYOBO) and the resultant structure was interposed between two graphite sheets. The electrodes have a size of 5 cm×5 cm. With regard to liquid electrolytes containing vanadium ions as a reactive material, 50 mL of 3M $H_2SO_4$ containing 1.5M $VO^{2+}$ dissolved therein was used as anolyte and 50 mL of 3M $H_2SO_4$ containing 1.5M $V^{3+}$ dissolved therein was used as catholyte. Herein, the electrolyte solutions were supplied to the vanadium battery at a pumping rate of 50 m Um in.

(1-3) Results of Morphological and Structural Analysis of Electrolyte Membranes

FIG. 8A to FIG. 8D are scanning electron microscopic (SEM) images illustrating the pristine Nafion 115 membrane according to Comparative Example 1 and the composite membrane coated with polyaniline (r-PN). It can be seen that the surface of Nafion 115 (FIG. 8A) is smooth, while the surface of r-PN (FIG. 8B) is slightly rough. This demonstrates that polyaniline as a metal ion-blocking layer is coated well on the Nafion 115 surface. When the section of Nafion 115 membrane (FIG. 8C) is compared to the surface (FIG. 8D) of r-PN, the polyaniline layer can be seen clearly. The polyaniline layer was coated uniformly to a thickness of 1.80-1.90 μm.

Figure 9:
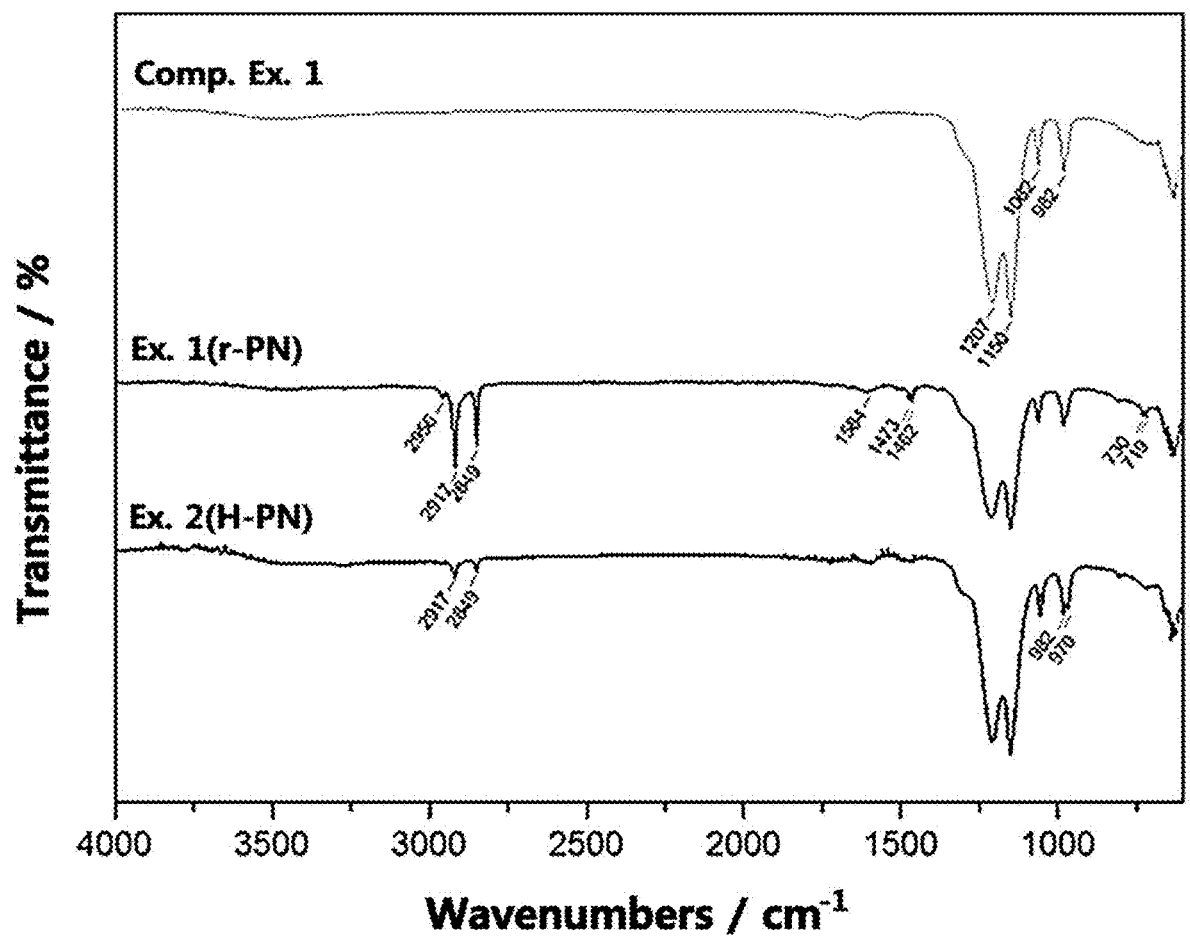
FIG. 9 shows the results of Fourier Transform Infrared spectroscopy for the composite polymer electrolyte membranes of Example 1 (r-PN Example) and Example 2 (H-PN Example) according to the present disclosure in comparison with Comparative Example 1.

FIG. 9 shows the results of FT-IR for the composite electrolyte membranes coated with polyaniline. It can be seen from the spectrum that polyaniline exists in the samples of r-PN and H-PN, unlike the pure Nafion membrane.

(1-4) Results of Determination of Vanadium Ion Permeability

Figure 10:
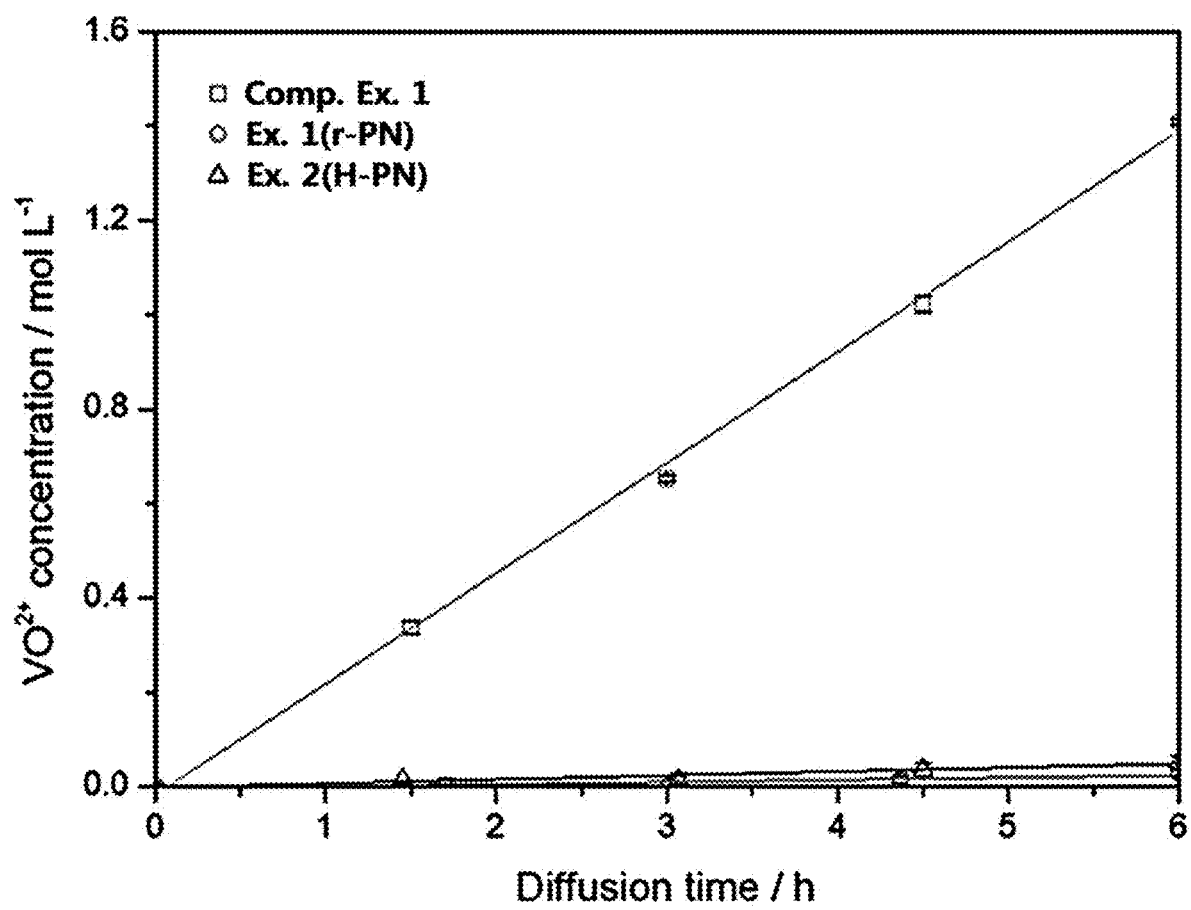
FIG. 10 shows the results of vanadium ion permeability for the composite polymer electrolyte membranes of Example 1 (r-PN Example) and Example 2 (H-PN Example) according to the present disclosure in comparison with Comparative Example 1.

FIG. 10 is a graph illustrating the vanadium permeation rates of Nafion 115 according to Comparative Example 1 and the composite membranes according to Examples (r-PN and H-PN). In the case of Nafion 115, it can be seen that the solution of the permeate side undergoes a change in color due to the permeation of vanadium ions after a lapse of 3 hours. On the contrary, the composite electrolyte membranes (r-PN and H-PN) coated with a polyaniline metal ion-blocking layer causes no clear change in color even after 6 hours. This suggests that the composite membranes (r-PN and H-PN) coated with polyaniline show significantly lower vanadium ion permeability as compared to Nafion 115 membrane. In other words, the composite electrolyte membranes have a significantly high metal ion-blocking effect. With regard to the vanadium ion permeability through the electrolyte membranes, Nafion 115 shows a vanadium ion permeability of $3.88 \times 10^{-6}$ $cm^2$ $s^{-1}$, which is similar to the value reported in the related document, and r-PN and H-PN show a vanadium ion permeability of $7.88 \times 10^{-8}$ $cm^2$ $s^{-1}$ and $13.9 \times 10^{-8}$ $cm^2$ $s^{-1}$, respectively. Thus, each of r-PN and H-PN shows significantly lower vanadium ion permeability as compared to Nafion 115. Such a high vanadium ion-blocking effect results from positively charged polyaniline which causes electrostatic repulsion force against positively charged vanadium ions.

(1-5) Results of Determination of Ion Conductivity

Figure 11:
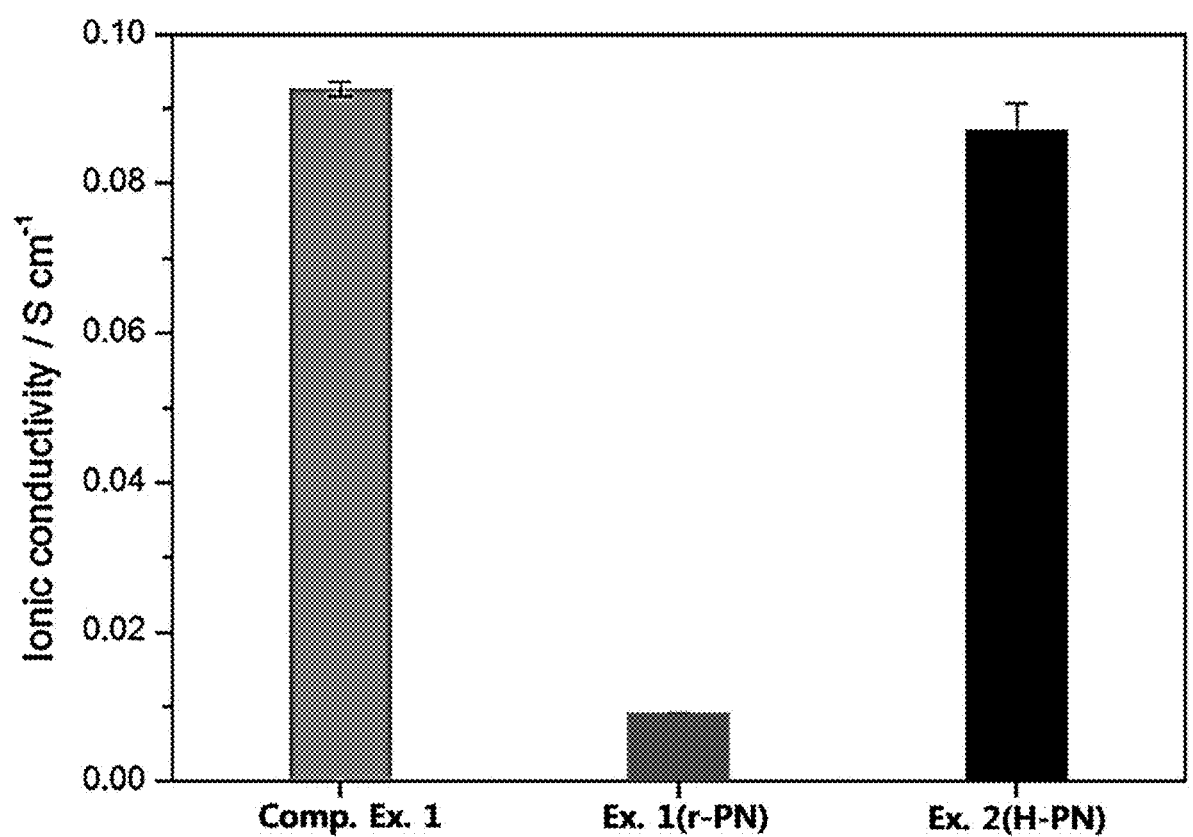
FIG. 11 shows the results of proton conductivity for the composite polymer electrolyte membranes of Example 1 (r-PN Example) and Example 2 (H-PN Example) according to the present disclosure in comparison with Comparative Example 1.

FIG. 11 is a graph illustrating the proton conductivity of each of Nafion 115 according to Comparative Example 1 and the composite membranes, r-PN and H-PN membranes. As shown in FIG. 11, pristine-Nafion 115 shows an ion conductivity of 0.093 S cm$^{-1}$, which is similar to the value reported in the related document (Membr. Sci. 484 (2015) 1-9). On the contrary, the r-PN electrolyte membrane shows a low ion conductivity of 0.009 S cm$^{-1}$. This suggests that polyaniline coated on the composite electrolyte membrane can reduce ion conductivity significantly. However, H-PN obtained by protonation through the treatment in 0.5M H$_2$SO$_4$ solution at 80° C. shows a high ion conductivity of 0.087 S cm$^{-1}$. The result is similar to the ion conductivity of Nafion 115. The reason why H-PN shows improved proton conductivity as compared to r-PN is that polyaniline in the emeraldine salt form provides cation channels, which are not present in polyaniline in the emeraldine base form of r-PN. As a result, the H-PN ion channels facilitate transport of protons, thereby providing high ion conductivity.

(1-6) Results of Determination of Vanadium Redox Flow Battery Performance

The performance of a vanadium redox battery using the composite electrolyte membrane was determined. The electrolyte membrane was interposed between two carbon felt electrodes (XF-30A, TOYOBO), which were then sandwiched between two graphite plates and subsequently between two metal plates followed by fastening the assembly tightly using a torque wrench to make a cell. The electrodes have a size of 5 cm×5 cm. With regard to liquid electrolytes, 3M H$_2$SO$_4$ (50 mL) containing 1.5M VO$^{2+}$ dissolved therein was used as anolyte and 3M H$_2$SO$_4$ (50 mL) containing 1.5M V$^{3+}$ dissolved therein was used as catholyte. The electrolyte was supplied at a rate of 50 mL/min and the redox battery was operated to measure the performance. The battery was cycled periodically between 1.6V and 0.7V at a current density of 50 mA/cm$^2$ during charge and discharge processes.

Figure 12:
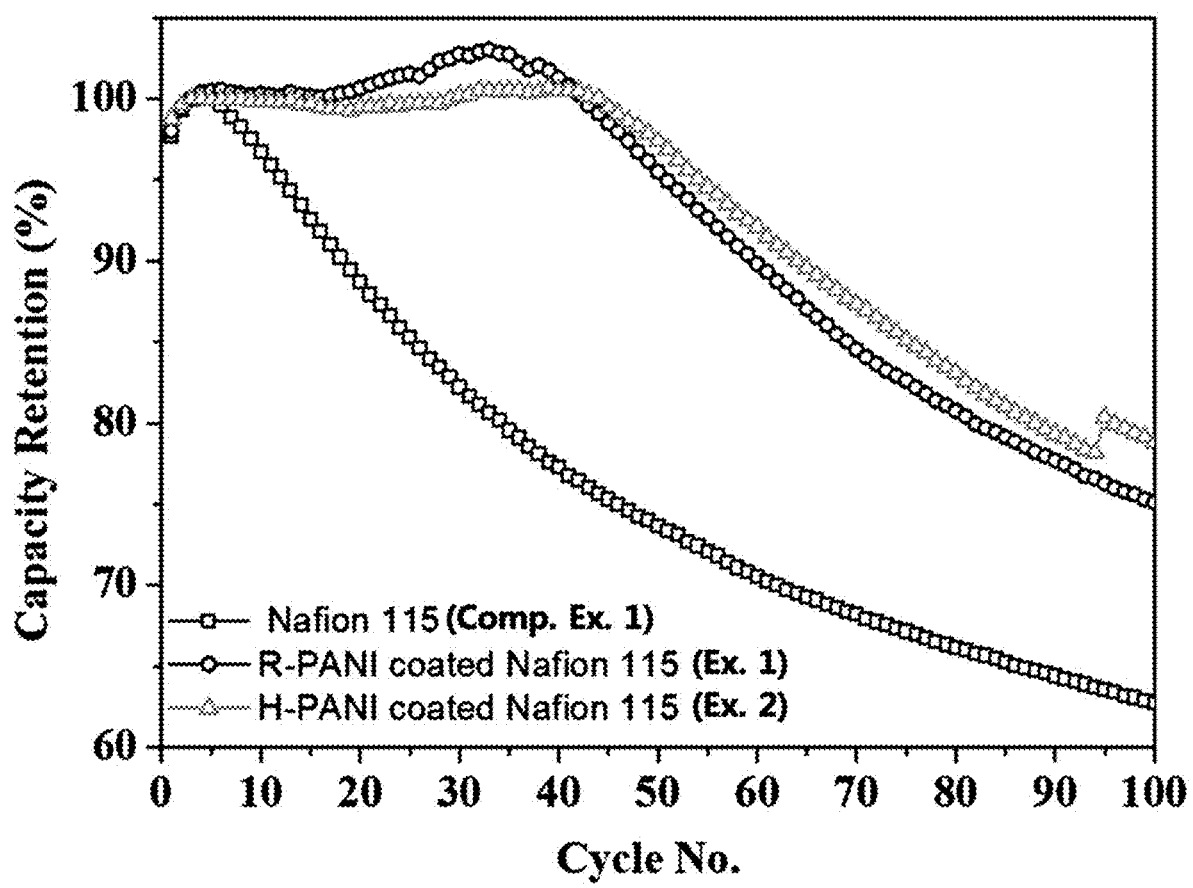
FIG. 12 shows the results of charge/discharge performance as determined by the capacity retention rates of the vanadium redox flow batteries using the composite polymer electrolyte membranes of Example 1 (r-PN Example) and Example 2 (H-PN Example) according to the present disclosure in comparison with the vanadium redox flow battery using Comparative Example 1.

FIG. 12 is a graph illustrating a change in capacity retention during the charge/discharge cycles of the vanadium battery. Herein, the performance of the batteries using Nafion 115 according to Comparative Example 1 or the modified membranes, r-PN and H-PN, was compared with one another under the charge/discharge current condition of 50 mA/cm$^2$. The composite electrolyte membranes coated with polyaniline cause reduced vanadium ion crossover, and thus show a significantly high capacity retention. The reason why H-PN shows higher capacity retention as compared to r-PN is that H-PN has significantly higher proton conductivity as compared to r-PN, even though H-PN shows slightly higher vanadium ion permeability as compared to r-PN. However, both membranes show a rapid drop in battery capacity after 40 cycles.

Figure 13A:
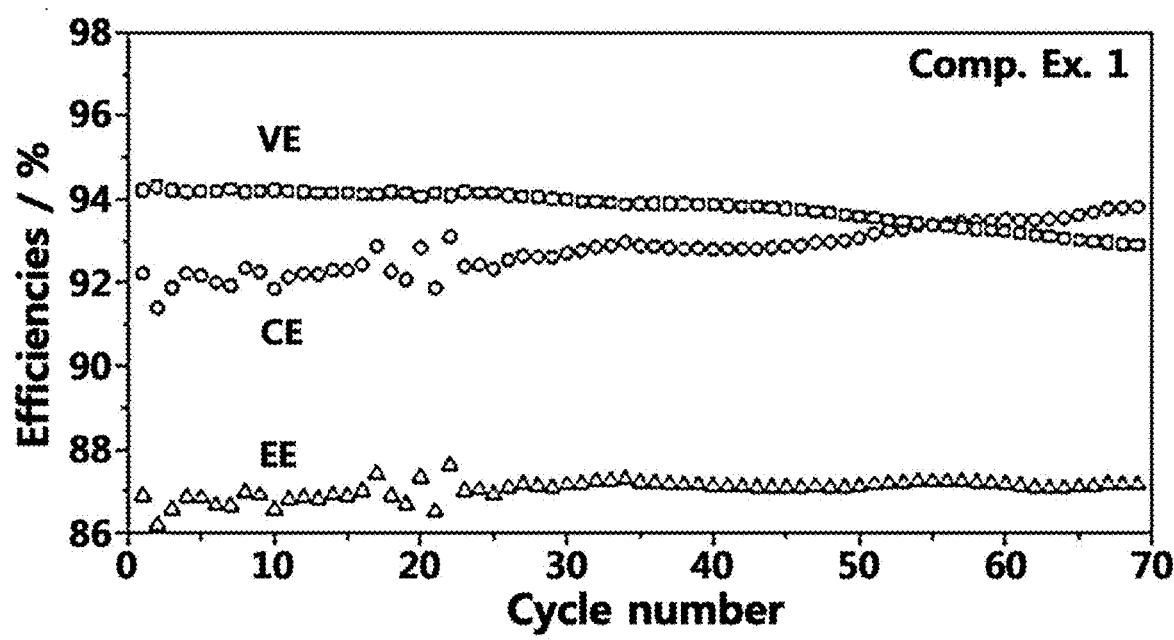
FIG. 13A to FIG. 13C show the results of voltage efficiency, current efficiency and energy efficiency for the composite polymer electrolyte membranes of Example 1 (r-PN Example) and Example 2 (H-PN Example) according to the present disclosure in comparison with Comparative Example 1, wherein (A) shows pristine-Nafion 115 (Comparative Example 1), (B) shows r-PN (Example 1) and (C) shows H-PN (Example 2).
Figure 13B:
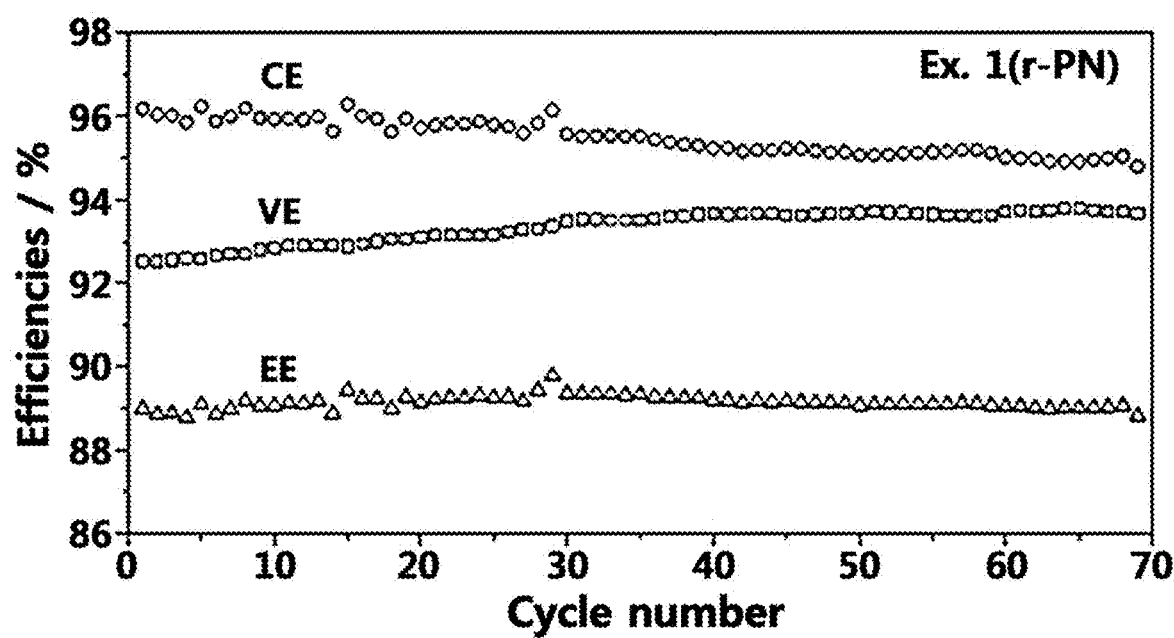
Figure 13C:
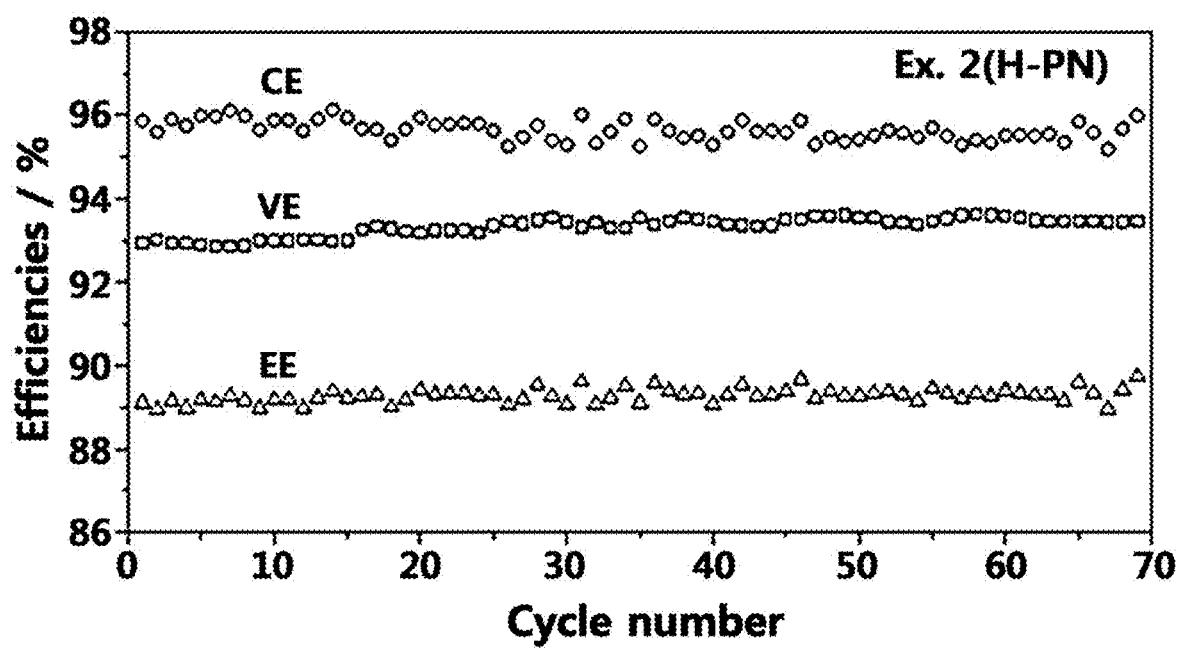

FIG. 13A to FIG. 13C are graphs illustrating current efficiencies, voltage efficiencies and energy efficiencies when the cells are operated under the same condition as FIG. 12. The positive charges of polyaniline (H-PN) have electrostatic repulsion force against vanadium ions to reduce a crossover phenomenon and to improve current efficiency. In addition, the polyaniline layer increases the resistance of the electrolyte membrane but the protonated polyaniline having relatively high proton conductivity has a voltage efficiency similar to the voltage efficiency of Nafion 115.

Therefore, the battery using the composite electrolyte membrane coated with a polyaniline metal ion-blocking layer as an electrolyte membrane shows excellent reversibility, high capacity retention and high efficiency, and thus is expected to increase the performance of a vanadium redox flow battery. However, there is still a technical problem related with improvement of the durability of the composite membrane.

Example 3

A Nafion polymer electrolyte layer, a fluorine-based polymer electrolyte material, was further applied onto the polyaniline layer coated on the Nafion membrane in the r-PN membrane (Example 1) through a dip coating process. The Nafion electrolyte includes the same ingredients as the Nafion membrane used as a support membrane. The dip coating process includes dipping the r-PN membrane according to Example 1 in 5% Nafion ionomer solution (Du Pont Co.) for 1 hour and removing it from the solution slowly. The Nafion ionomer thin films were applied to both surfaces of the composite electrolyte membrane through the above-mentioned dip coating process to obtain a protective composite membrane (NL-PA-N115: Nafion protective layer+polyaniline layer+N115 support membrane) like the one in FIG. 5B. The resultant membrane was further treated with a 0.5M sulfuric acid solution in the same manner as Example 1 to implement protonation.

Figure 14:
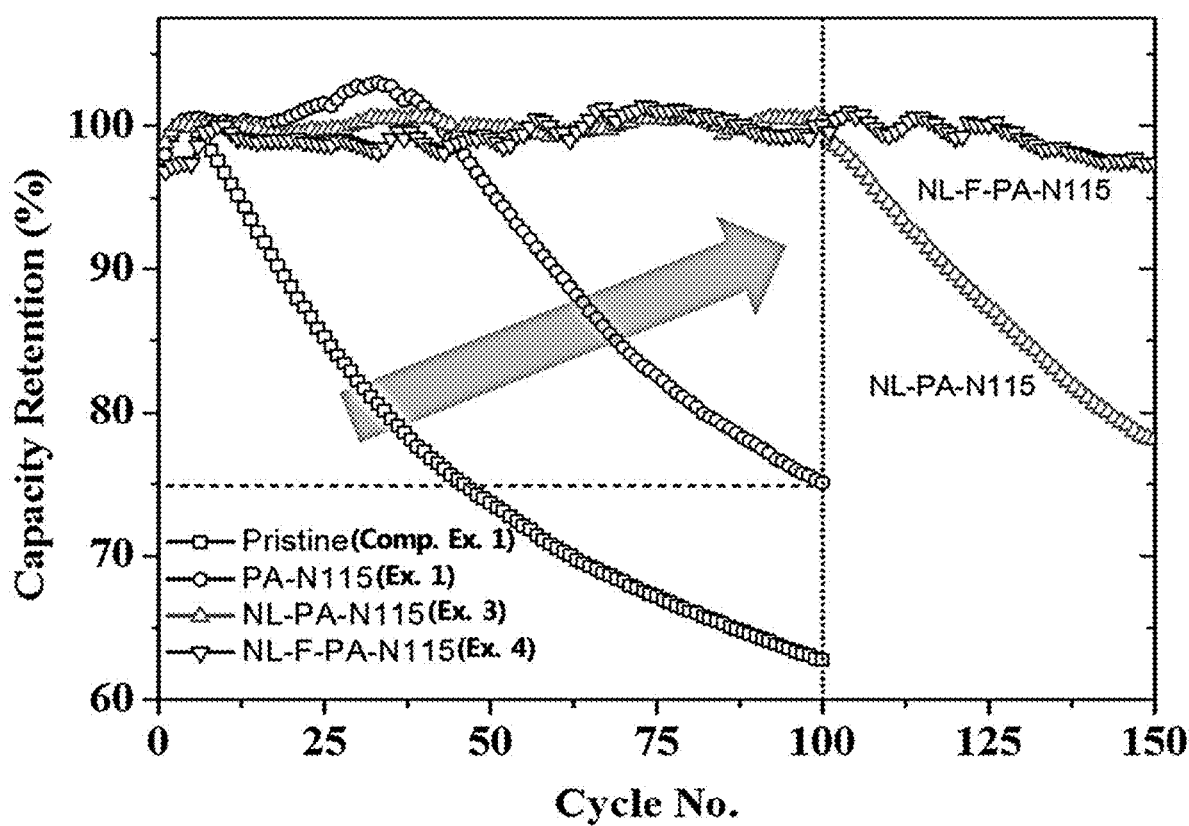
FIG. 14 shows the results of charge/discharge performance of the vanadium redox flow batteries using the composite polymer electrolyte membranes of Example 3 and Example 4 according to the present disclosure.

Characterization of the resultant protective composite membrane shows its vanadium ion permeability and ion conductivity similar to those of H-PN substantially, as shown in Table 1. In addition, after the charge/discharge test of the redox battery, the redox battery shows high performance without degradation of capacity even up to 100 cycles, as shown in FIG. 14. However, the battery capacity starts to decrease after 100 cycles. It is thought that this is because the polyaniline layer is degraded and loses its functions.

TABLE 1

| Samples | Vanadium ion permeability (cm$^2$s$^{-1}$) | Ion conductivity (S cm$^{-1}$) |
|---|---|---|
| Pristine Nafion 115 (Comp. Ex. 1) | 3.88 × 10$^{-6}$ | 0.093 |
| r-PN (Ex. 1) | 7.88 × 10$^{-8}$ | 0.009 |
| H-PN (Ex. 2) | 13.9 × 10$^{-8}$ | 0.087 |
| NL-PA-N115 (Ex. 3) | 13.5 × 10$^{-8}$ | 0.085 |
| NL-F-PA-N115 (Ex. 4) | 11.3 × 10$^{-8}$ | 0.078 |

Example 4

The composite membrane according to Example 3 (a Nafion membrane coated with polyaniline) was introduced to a glow discharge plasma reactor and treated with fluorine plasma. Herein, perfluorooctane (C$_8$F$_{18}$) was used as a precursor of fluorine plasma and the treatment was carried out at room temperature under the condition of 0.3 torr and 200 W. Next, Nafion solution was further coated on the fluorine-treated membrane to form a Nafion protective layer and the resultant membrane was subjected to high-temperature drying and annealing. Then, protonation was carried out by dipping the resultant membrane in 0.5M sulfuric acid solution to obtain a protective stabilized composite membrane.

The resultant fluoro-composite membrane (a protective stabilized composite membrane: NL-F-PA-N115=Nafion layer+fluorine layer+polyaniline layer+N115 support membrane) (FIG. 6B) was used to fabricate a redox battery and the performance of the battery was determined. As shown in FIG. 14, the redox battery shows stabilized performance without any significant change in battery capacity even after 150 cycles. In other words, it can be seen that since the polyaniline layer as a metal ion-blocking layer is treated with fluorine plasma to form a stabilization layer, the metal ion-blocking layer (polyaniline layer) can provide significantly improved electrochemical stability and durability even in an environment of high-concentration sulfuric acid.

It should be understood that the scope of the present disclosure is not limited to the detailed description and specific examples. The scope of the present disclosure is defined by the following claims only, and various changes and modifications can be made by those skilled in the art. Therefore, it should be understood that the scope of the present disclosure covers such changes and modifications, as long as they are apparent to those skilled in the art.

What is claimed is:

1. A composite polymer electrolyte membrane comprising:
   a support membrane comprising a cation conductive polymer;
   a metal ion-blocking layer stacked on the support membrane; and
   a stabilization layer disposed at a surface of the metal ion-blocking layer, wherein the stabilization layer comprises fluorine or silicon functional groups attached to the surface of the metal ion-blocking layer, or fluorine or silicon elements are doped into the surface of the metal ion-blocking layer, the stabilization layer having a thickness in a range of 0.1 nm to 10 nm.

2. The composite polymer electrolyte membrane according to claim 1, wherein the support membrane comprises a non-porous separator comprising a cation conductive polymer or a porous separator of which pores are filled with a cation conductive polymer.

3. The composite polymer electrolyte membrane according to claim 1, wherein the cation conductive polymer comprises a cation exchange group selected from the group consisting of a sulfonic acid group, phosphoric acid group, and a carboxylic acid group.

4. The composite polymer electrolyte membrane according to claim 3, wherein the sulfonic acid group-containing cation conductive polymer is selected from the group consisting of perfluorosulfonic acid, poly(styrene sulfonic acid) (PSSA), sulfonated poly(ether ether ketone) (SPEEK), sulfonated poly(ether sulfone) (SPES), sulfonated poly(aryl ether ketone) (SPAEK), sulfonated polybenzimidazole (S-PBI), sulfonated poly(phenylene oxide) (SPPO), and sulfonated polyimide (SPI).

5. The composite polymer electrolyte membrane according to claim 1, wherein the cation conductive polymer is a perfluorosulfonic acid-based electrolyte or hydrocarbon-based polymer electrolyte.

6. The composite polymer electrolyte membrane according to claim 2, wherein the porous separator comprises at least one polymer selected from the group consisting of polyethylene (PE), polysulfide (PS), polypropylene (PP), polycarbonate (PC), polytetrafluoroethylene (PTFE), polyvinyl chloride (PVC), polyvinylidene difluoride (PVdF), polyacrylonitrile (PAN), and polyimide (PI).

7. The composite polymer electrolyte membrane according to claim 1, wherein the metal ion-blocking layer comprises an anion exchange polymer or anion exchange polymer electrolyte material.

8. The composite polymer electrolyte membrane according to claim 7, wherein the anion exchange polymer is at least one selected from the group consisting of polypyrrole, polyaniline, fluorinated polyaniline and poly(fluoroaniline), polypyridine, polyazepine, polycarbazole, and polyindole, and the anion exchange polymer electrolyte material is a chloro- or bromomethylated polymer to which at least one anion exchange group selected from trimethyl amine, imidazolium, phosphonium, ammonium, guanidinium, or benzimidazolium is bound.

9. The composite polymer electrolyte membrane according to claim 8, wherein the polymer to which at least one anion exchange group is bound is at least one polymer selected from polysulfone, polyetheretherketone, polyphenylene oxide, or polyethylene.

10. The composite polymer electrolyte membrane according to claim 8, wherein the anion exchange polymer comprises polyaniline in an emeraldine state.

11. The composite polymer electrolyte membrane according to claim 1, which comprises at least two metal ion-blocking layers.

12. The composite polymer electrolyte membrane according to claim 1, wherein the metal ion-blocking layer is protonated.

13. The composite polymer electrolyte membrane according to claim 1, which further comprises a protective layer, and the protective layer comprises a cation conductive polymer.

14. A redox flow battery comprising the composite polymer electrolyte membrane as defined in claim 1.

15. An electrochemical reactor comprising the composite polymer electrolyte membrane as defined in claim 1.

16. A composite polymer electrolyte membrane comprising:
    a support membrane comprising a cation conductive polymer; and
    a metal ion-blocking layer with a surface that is stacked on the support membrane, and an opposite surface that is stabilized with fluorine or silicon functional groups attached to the opposite surface, or is stabilized with fluorine or silicon elements doped into the opposite surface, wherein the stabilized surface has a thickness in a range of 0.1 nm to 10 nm.

17. The composite polymer electrolyte membrane according to claim 16, wherein the support membrane further comprises;
    a non-porous separator that includes a cation conductive polymer, or
    a porous separator in which pores are filled with a cation conductive polymer.

18. The composite polymer electrolyte membrane according to claim 16, wherein the cation conductive polymer comprises;
    a sulfonic acid group-containing cation conductive polymer of perfluorosulfonic acid, poly(styrene sulfonic acid) (PSSA), sulfonated poly(ether ether ketone) (SPEEK), sulfonated poly(ether sulfone) (SPES), sulfonated poly(aryl ether ketone) (SPAEK), sulfonated polybenzimidazole (S-PBI), sulfonated poly(phenylene oxide) (SPPO), or sulfonated polyimide (SPI), or
    a perfluorosulfonic acid-based electrolyte or hydrocarbon-based polymer electrolyte.

19. The composite polymer electrolyte membrane according to claim 16, wherein the metal ion-blocking layer comprises an anion exchange polymer, or an anion exchange polymer electrolyte material,
    wherein the anion exchange polymer is polypyrrole, polyaniline, fluorinated polyaniline and poly(fluoroaniline), polypyridine, polyazepine, polycarbazole, polyindole, or a combination thereof, and
    the anion exchange polymer electrolyte material is a chloro- or bromomethylated polymer that includes at least one anion exchange group selected from trimethyl amine, imidazolium, phosphonium, ammonium, guanidinium, or benzimidazolium is bound to the polymer.

* * * * *